United States Patent Office 3,595,974
Patented July 27, 1971

3,595,974
BIS-SILYLPHENYL CARBONATES
Norman C. Lloyd, Cardiff, Glamorgan, Christopher A. Pearce, Cowbridge, Glamorgan, and Ian Pattison, Penarth, Glamorgan, Wales, assignors to Midland Silicones Limited, Reading, Berkshire, England
No Drawing. Filed May 21, 1969, Ser. No. 826,730
Claims priority, application Great Britain, May 29, 1968, 25,831/68; Oct. 9, 1968, 47,800/68
Int. Cl. C07f 7/02, 7/04
U.S. Cl. 260—448.2B
11 Claims

ABSTRACT OF THE DISCLOSURE

Bis-silylphenylcarbonates of the general formula

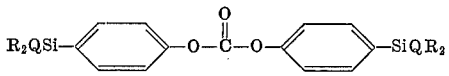

where Q is H, halogen, alkoxy, monovalent hydrocarbon radical or —OH, and R is alkyl, alkenyl or aryl radical and preparation thereof by reacting the corresponding silylated phenols with an ester-forming derivative of carbonic acid such as phosgene and corresponding polymers and copolymers prepared by hydrolysis of Q groups from the silicon atoms.

---

This invention relates to monomeric, polymeric and copolymeric organosilicon materials containing the diphenyl carbonate group.

According to one aspect of the invention, there are provided organosilicon compounds of the general formula

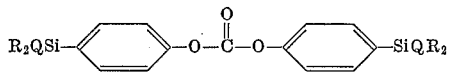

wherein each Q represents a hydrogen atom, a halogen atom, a monovalent hydrocarbon radical, an alkoxy radical containing less than 8 carbon atoms or a hydroxyl radical and each R represents an alkyl, alkenyl or aryl radical, for example, the methyl, ethyl, propyl, butyl, nonyl, octadecyl, vinyl, allyl, phenyl and naphthyl radicals. In view of the ready availability of the methyl and phenyl substituted silane starting materials for preparing the compounds, each R is preferably a methyl or phenyl radical. Similarly, when Q is a monovalent hydrocarbon radical, it is preferably selected from methyl and phenyl radicals.

The compounds defined by the above general formula in which Q represents a hydrogen atom or a hydrocarbon radical can be prepared by the reaction of (A) a silylated phenol of the general formula

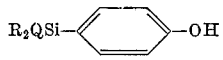

wherein Q is hydrogen or a monovalent hydrocarbon radical with (B) an ester-forming derivative of carbonic acid, for example, phosgene or diphenyl carbonate, phosgene being preferred, and this invention includes such a process.

The silylated phenols which are employed as reactant (a) according to the said process in which Q is a methyl radical are known. Silylated phenols in which Q is a hydrogen atom can be obtained, for example, by the hydrolysis of a compound of the general formula

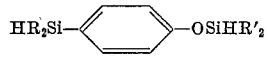

according to the method described in our co-pending application Ser. No. 832,732, filed May 21, 1969. Briefly, the process described therein involves the preparation of a compound of the formula

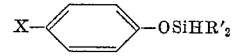

by the reaction of a halophenol

wherein X is chlorine or bromine, with a disilazane of the formula $(R'_2SiH)_2NR'''$ or a silylamine $R'_2HSiNR''_2$ where R' represents a monovalent hydrocarbon radical, R''' is hydrogen or an alkyl radical and R'' represents a hydrogen atom, an alkyl radical or an aryl radical, or with $R'_2SiHCl$ in the presence of an HCl acceptor. This product is then reacted with the compound $R_2HSiCl$ via a Wurtz-Fittig reaction or a Grignard reaction to provide a compound of the formula

which can then be hydrolyzed to the desired starting material for reaction with the carbonic acid derivative.

When the ester-forming derivative is phosgene, the reaction between it and the silylated phenol is best performed in the presence of a hydrogen halide acceptor, for example, triethylamine, pyridine or other tertiary base. In this way, the possibility or cleavage of the silicon-hydrogen bonds and/or silicon-aryl bonds in the reactant and the desired product is minimized. When diphenyl carbonate is employed as a reactant, the process proceeds by way of an ester interchange reaction and a suitable catalyst for this reaction should be employed. In view of the susceptibility of the carbonate group to cleavage in the presence of bases, the catalyst is preferably acidic rather than basic in nature.

Preferably, the reaction is performed in the presence of a solvent as this facilitates the processing involved in carrying out the reaction and recovery of the product. Any of a wide variety of solvents can be employed including hydrocarbons, chlorinated hydrocarbons and ethers. Most preferred is a mixture of aliphatic and aromatic hydrocarbons to provide for solubility of the phenol and insolubility of the amine hydrochloride produced. The use of a solvent is particularly beneficial when the ester-forming carbonic acid derivative is phosgene since this material is gaseous at room temperature and is also toxic. It is, therefore, preferred to employ the phosgene as a solution in a suitable organic solvent such as toluene. It is also advantageous to employ a solvent in which the amine salt by-product shows the maximum insolubility thereby facilitating the removal of this material during recovery of the product.

The reaction can be carried forward at temperatures ranging up to the reflux temperature of the reaction mixture at the particular pressure employed. Preferably, the preparative reaction involving ester exchange with diphenyl carbonate is performed at an elevated temperature. However, the silylated phenol-phosgene reaction is exothermic and the reaction will proceed at an acceptable rate at temperatures ranging from below 0° C. Conveniently, the reaction is allowed to proceed at room temperature, that is, at about 25° C. although heat may be supplied to the system if desired.

The relative proportions of the silylated phenol and ester-forming derivative of carbonic acid employed are not narrowly critical. For optimum yields, however, we prefer to employ about 2 moles of the silylated phenol for every mole of the ester-forming derivative of carbonic acid.

The compounds of this invention wherein Q represents a hydrogen atom can be converted to the corresponding compounds wherein Q represents a halogen atom by halogenation of the silicon-bonded hydrogen atoms. Any of the known general methods for halogenating ≡SiH can be employed, for example, by contact with the halogen itself or with a halogenated compound. One convenient method of preparing the dichloro-compound comprises passing chlorine through a solution of the silicon-hydrogen compound in an organic solvent such as carbon tetrachloride. The bromo compound can be obtained, for example, from the reaction of the silicon-hydrogen compound with N-bromosuccinimide.

The dihalo-compounds are useful as intermediates in the preparation of other organosilicon materials. For example, they can be hydrolyzed to the corresponding disilanols which can then be subjected to a polymerization or copolymerization process. For this purpose, the dichloro-compounds have been found to be preferable to the corresponding silicon-hydrogen or di-alkoxy compound.

Compounds of this invention in which Q represents an alkoxy radical containing less than 8 carbon atoms, preferably the methoxy, ethoxy, propoxy or butoxy radical, can be obtained from the corresponding compounds in which Q represents a hydrogen atom by alcoholysis thereof to effect conversion of the silicon-bonded hydrogen atoms to the desired alkoxy radicals. Conversion to the alkoxy derivative can be carried out by heating the silicon-hydrogen containing compound with the appropriate alcohol in the presence of a suitable catalyst, for example, chloroplatinic acid.

Compounds of this invention wherein Q represents the hydroxyl radical can be obtained by hydrolysis of the corresponding alkoxy or halo- compound. Alternatively, they can be prepared directly from the silicon-hydrogen compound by the reaction thereof with a mixture of the appropriate alcohol and water, in the presence of a suitable catalyst, for example, chloroplatinic acid.

The compounds of this invention are of particular utility as intermediates in the preparation of polymeric organo silicon materials containing silicon and diphenyl carbonate groups. For example, the silanol-containing compounds, that is, those in which Q represents a hydroxyl radical, can be condensed by way of the silanol groups, either with themselves or with other silanol-containing materials to form polymers or copolymers as the case may be containing units of the general formula

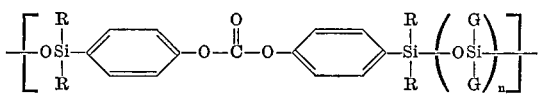

wherein $n$ is zero or an integer, each G is a monovalent hydrocarbon radical or monovalent substituted hydrocarbon radical and R is as hereinbefore defined. Thus, the silanol-containing diphenyl carbonate containing compounds of the invention can be self condensed to provide homopolymers ($n$=zero) or they can be condensed with other SiOH-containing materials, for example, silanols of siloxanols to provide copolymers containing a siloxane proportion which will depend on the value of $n$. Polymers and copolymers defined by the above general formula are believed to be novel products and represent a further aspect of this invention.

In the general formula each G may be the same or different and can represent monovalent hydrocarbon radicals, for example, alkyl radicals such as methyl, ethyl, propyl, butyl, nonyl and octadecyl, alkenyl radicals such as vinyl and allyl and aryl radicals such as phenyl and naphthyl. Each G can also be a substituted monovalent hydrocarbon radical, for example, a chloromethyl, bromophenyl, trifluoropropyl, cyanopropyl, aminoalkyl or poly(amino)alkyl radical.

In another method of preparing diphenyl carbonate containing organosilicon materials, the compounds of this invention wherein Q represents the hydrogen atom can be reacted with a compound containing olefinic unsaturation, for example, an allyl silane or a vinyl containing siloxane polymer either to produce new compounds or polymers or to effect the cross-linking thereof. Examples of such unsaturated compounds include allyltrichlorosilane, vinylmethyldichlorosilane, vinyltriethoxysilane, and organosiloxane polymers containing terminal or side chain silicon-bonded vinyl radicals. Methods for carrying out the addition of silicon-hydrogen compounds to organic or organosilicon compounds are now well known to those skilled in the art, the reaction normally being performed in the presence of a free radical catalyst or more preferably a platinum metal or compound or complex of a platinum metal. The products of this reaction will contain at least one group of the formula

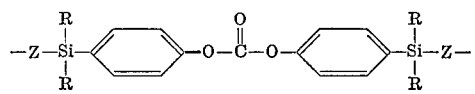

wherein Z is an alkylene radical, the free valency of which is attached to a silicon atom in a silyl, siloxy or polysiloxane group. Such products constitute a further aspect of this invention. When the free valency of the alkylene radical Z is attached to a silicon atom which also carries one or more hydrolyzable moieties, e.g., halogen atoms, alkoxy radicals or acyloxy radicals, the compounds can be hydrolyzed to polymers containing diphenyl carbonate groups, —Si—Z—Si— linkages and siloxane linkages. Polymers of this type can also be prepared by addition of the compounds of this invention in which Q is a hydrogen atom to an organopolysiloxane containing silicon-bonded alkenyl radicals.

The invention is illustrated by the following examples and is not limited by the examples.

EXAMPLE 1 p-Dimethylsilylphenol (50 g., 0.33 mole) was dissolved in a mixture of hexane (25 ml.) and toluene (25 ml.) and triethylamine (3.1 g., 0.031 mole) added. Phosgene (16.5 ml. of a 11% w./w. solution in toluene) was then added dropwise to the stirred mixture at 22° C. An exothermic reaction took place and a white precipitate of triethylammonium chloride formed which was then removed by filtration. The solvents were removed from the filtrate by distillation under reduced pressure to leave 5.8 g. of crude product which on recrystallization from aqueous ethanol yielded bis-(p-dimethylsilylphenyl) carbonate (4.7 g., 87%), M.P. 70° C. The structure of the product was confirmed by elemental analysis.

Calc. for

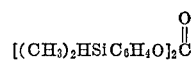

(percent): C, 61.8; H, 6.7; Si, 17.0%, and by infrared spectroscopy. Found (percent): C, 62.7; H, 6.4; Si, 16.95.

EXAMPLE 2

Bis-(p - dimethylsilylphenyl)carbonate (0.5 g., 0.0015 mole) prepared as described in Example 1 was suspended in dry methanol (5 ml.) and chloroplatinic acid (4μ l. solution containing 10% Pt) added. Hydrogen was evolved and the reaction was slightly exothermic. After 1 hour, the excess methanol was removed at low pressure leaving a colorless crystalline solid (0.7 g.) which was recrystallized from dry hexane to yield bis-[p-dimethyl-(methoxy)silylphenyl] carbonate the structure of which was confirmed by elemental analysis.

Calc. for [(CH$_3$)$_2$(CH$_3$O)SiC$_6$H$_4$O]$_2$CO (percent): C, 58.5; H, 6.7; Si, 14.3 and by infrared spectroscopy. Found (percent): C, 59.5; H, 6.4; Si, 15.5.

EXAMPLE 3

Bis-(p-dimethylsilylphenyl)carbonate (0.25 g., 0.0007 mole) (as prepared in Example 1) was dissolved in wet methanol and chloroplatinic acid (20μ l. of a solution containing 10% Pt) added. Hydrogen was evolved and after one hour the infrared spectrum of the reaction mixture indicated that all of the silicon-bonded hydrogen atoms had reached. The solution was then diluted with water to precipitate the product as oily droplets which were extracted and separated from the aqueous layer with diethyl ether.

Evaporation of the solvent from the ether extract yield a clear tacky polymeric gum. On heating to 145° C. for 72 hours, the gum was converted to a tough, resinous polymer.

The infrared spectrum of the product was consistent with the product being a polymer containing the repeating unit

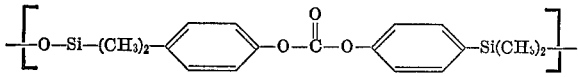

The average molecular weight of the polymer was in excess of 10,000.

EXAMPLE 4 p-Trimethylsilylphenol (5.1 g., 0.031 mole) was dissolved in a mixture of hexane (25 mls.) and toluene (25 mls.) and triethylamine (3.1 g., 0.031 mole) added. Phosgene (16 ml. 8.7% w./w. solution in toluene) was then added dropwise to the stirred mixture. An exothermic reaction took place and a white precipitate of triethylammonium chloride was formed (4.2 g.) which was removed by filtration. The filtrate was distilled free from solvent (at reduced pressure in the last stages) leaving a viscous liquid residue which slowly solidified on cooling to room temperature to yield after recrystallization from aqueous ethanol, bis-(p-trimethylsilyl) carbonate as colorless crystalline needles, e.g., (4.3 g., 78%) having a melting point of 85° C.

The structure of the product was confirmed by elemental analysis.

Calcd. for $(CH_3)_3SiC_6H_4O_2CO$ (percent): C, 63.65; H, 7.3; Si, 15.6, and by infrared spectroscopy. Found (percent): C, 63.95; H, 7.5; Si, 15.9.

EXAMPLE 5

Bis-(p-dimethylsilylphenyl)carbonate (10 g., 29 m. mole) was dissolved in a mixture of pyridine (5 g., 63.4 m. mole) and carbon tetrachloride (100 cc.). Chlorine gas was passed through the solution, cooled to 0° C. for thirty minutes. The solution was filtered and the solvent removed by vacuum distillation. The product bis-(p-dimethylchlorosilylphenyl)carbonate $$[(CH_3)_2SiClC_6H_4O]_2CO$$

M.P. 93° C. was recrystallized from hexane. The structure of the product was confirmed by elemental analysis and infrared spectroscopy.

$C_{17}H_{20}Si_2Cl_2O_3$ requires (percent): C, 51.2; H, 5.02; Si, 14.05; Cl, 17.8. Found (percent): C, 52.0; H, 4.88; Si, 13.7; Cl, 16.9.

EXAMPLE 6

Bis (p - dimethylchlorosilylphenyl)carbonate (2 g., 5 m. mole) was dissolved in toluene (20 cc.) and water (0.09 g., 5 m. mole) was added slowly with stirring. The solution was refluxed for three days and then the solvent was removed by vacuum distillation. The product was heated under vacuum for three days at 120° C. to remove any remaining volatile materials.

The infrared spectrum and elemental analysis of the product, a yellow solid, was consistent with the product being a polymer containing the repeating unit

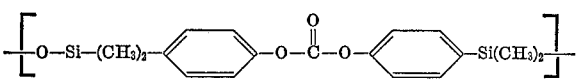

The average molecular weight of the polymer was in excess of 30,000.

EXAMPLE 7

Vinylmethyldichlorosilane (3 g., 21 m. moles) was added to a solution of bis-(p-dimethylsilylphenyl)carbonate (1.6 g., 5 m. moles) in benzene (50 cc.). The solution was warmed to 70° C. and chloroplatinic acid (30μ 1. of a 10% solution in isopropanol) was added. After two hours the solvent was removed by vacuum distillation and the product $$[Cl_2Si(CH_3)CH_2CH_2Si(CH_3)_2C_6H_4O]_2CO$$

was distilled B.P. 251° C. at 0.01 mms. The yield was 2.5 g., i.e., 80%.

The structure of the product was confirmed by elemental analysis.

Calc. for $(Cl_2Si(CH_3)CH_2CH_2Si(CH_3)_2C_6H_4O)_2CO$ (percent): C, 43.3; H, 5.58; Si, 18.4 and by infrared spectroscopy. Found (percent): C, 42.5; H, 5.68; Si, 18.3.

The organosilicon compound $$(Cl_2Si(CH_3)CH_2CH_2Si(CH_3)_2C_6H_4O)_2CO$$

prepared above was dissolved in benzene and hydrolyzed by addition of the solution to water. A white amorphous cross-linked polymer $$[(OSi(CH_3)CH_2CH_2Si(CH_3)_2C_6H_4O)_2CO]_x$$

was obtained.

The structure of the product was confirmed by elemental analysis.

Calc. for $[(OSi(CH_3)CH_2CH_2Si(CH_3)_2C_6H_4O)_2CO]_x$ (percent): C, 55.1; H, 6.79 and by infrared spectroscopy. Found (percent): C, 54.5; H, 6.77.

That which is claimed is:

1. Organosilicon compounds of the general formula

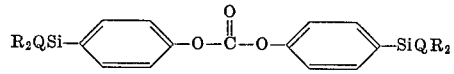

wherein each Q represents a hydrogen atom, a halogen atom, monovalent hydrocarbon radical, an alkoxy radical containing less than eight carbon atoms or a hydroxyl radical and each R represents an alkyl, alkenyl or aryl radical.

2. Organosilicon compounds of the general formula

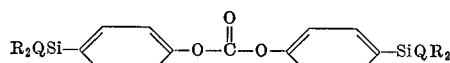

wherein each Q represents a hydrogen atom, a monovalent hydrocarbon radical, an alkoxy radical containing from 1 to 4 carbon atoms or a hydroxyl radical and each R represents an alkyl, alkenyl or aryl radical.

3. Organosilicon compounds as claimed in claim 1 wherein R is a methyl or phenyl radical.

4. The compound bis-(p-dimethylsilylphenyl)carbonate.

5. The compound bis-(p-dimethylchlorosilylphenyl) carbonate.

6. The compound bis-(p-dimethylmethoxysilylphenyl) carbonate.

7. A process for the preparation of an organosilicon compound of the general formula

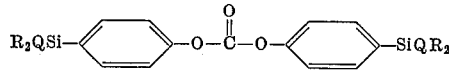

wherein each Q represents a hydrogen atom or a monovalent hydrocarbon radical and each R is an alkyl, alkenyl or aryl radical which comprises reacting (A) a silylated phenol of the general formula

wherein Q and R are as above defined, with (B) an ester-forming derivative of carbonic acid.

8. A process as claimed in claim 7 wherein (B) is phosgene.

9. A process as claimed in claim 8 wherein the reaction between (A) and (B) is carried out in the presence of a hydrogen halide acceptor.

10. Organosilicon polymers containing units of the general formula

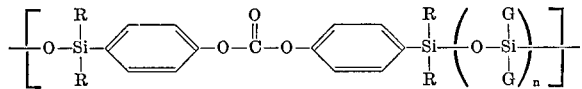

in which $n$ is zero or an integer, each G is a monovalent hydrocarbon radical or monovalent substituted hydrocarbon radical and each R is an alkyl, alkenyl or aryl radical.

11. Organosilicon compounds containing at least one group of the general formula

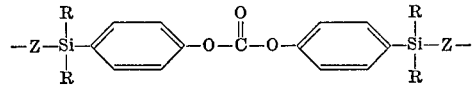

wherein Z is an alkylene radical, the free valency bond of which is attached to a silicon atom in a silyl, siloxy or polysiloxane group and each R is an alkyl, aryl or alkenyl radical.

References Cited

UNITED STATES PATENTS

| | | | |
|---|---|---|---|
| 3,050,501 | 8/1962 | Sommer | 260—46.5 |
| 3,338,869 | 8/1967 | Haluska | 260—46.5 |
| 3,402,192 | 9/1968 | Haluska | 260—448.2 |
| 3,445,496 | 5/1969 | Ryan | 260—448.8 |

JAMES E. POER, Primary Examiner

W. F. W. BELLAMY, Assistant Examiner

U.S. Cl. X.R.

260—448.2E, 448.2H, 448.8, 46.5